United States Patent [19]

Moriyama et al.

[11] Patent Number: 4,864,632
[45] Date of Patent: Sep. 5, 1989

[54] INDOOR WIRING SYSTEM FOR VHF/UHF SIGNAL LINES

[75] Inventors: Atsuo Moriyama, Oomiya; Yoichi Akashi, Tokyo; Kazunori Sekiuchi, Kawagoe; Toshio Nagakura, Ageo; Akira Kobayashi, Funabashi, all of Japan

[73] Assignee: Yagi Antenna Co., LtC., Tokyo, Japan

[21] Appl. No.: 933,925

[22] Filed: Nov. 24, 1986

[30] Foreign Application Priority Data

Nov. 29, 1985 [JP] Japan .......................... 60-183991[U]
Dec. 9, 1985 [JP] Japan .......................... 60-189230[U]
Dec. 9, 1985 [JP] Japan ................................ 60-276218

[51] Int. Cl.$^4$ .............................................. H04H 1/02
[52] U.S. Cl. .......................................... 455/3; 455/6; 358/86; 439/578
[58] Field of Search ................... 455/3, 5, 6; 439/578; 358/86; 381/77

[56] References Cited

U.S. PATENT DOCUMENTS

| | | | |
|---|---|---|---|
| 3,631,348 | 12/1971 | Lehmann | 455/3 |
| 3,699,250 | 10/1972 | Bunting | 455/3 |
| 4,451,108 | 5/1984 | Skidmore | 439/578 |
| 4,527,136 | 7/1985 | Kamiya | 455/3 |

FOREIGN PATENT DOCUMENTS

| | | |
|---|---|---|
| 535523 | 2/1978 | Japan . |
| 55-13117 | 4/1980 | Japan . |
| 55-51103 | 11/1980 | Japan . |
| 58-24498 | 5/1983 | Japan . |
| 58-48836 | 11/1983 | Japan . |
| 58-48837 | 11/1983 | Japan . |
| 60-13191 | 4/1985 | Japan . |

OTHER PUBLICATIONS

Trompeter Electronics, Inc. Catalog T9; pp. 2, 27, 28 and 29; Aug. 27, 1973.
Radio Shack 1985 Catalog; pp. 107 and 126; ©1984.

Primary Examiner—Robert L. Griffin
Assistant Examiner—Ralph E. Smith
Attorney, Agent, or Firm—Nixon & Vanderhye

[57] ABSTRACT

Disclosed is a wiring system which has a terminal device having an output mini-jack connected to a reception antenna, a booster having input and output mini-jacks, intermediate equipment, e.g., a distributor, a branching filter, and the like, and a cable unit having a coaxial cable at two ends of which mini-plugs are arranged, and in which the terminal device and the intermediate equipment are connected by the cable unit. The cable unit has a small-diameter coaxial cable, e.g., a 1.7C-2V cable.

6 Claims, 12 Drawing Sheets

F I G. 12
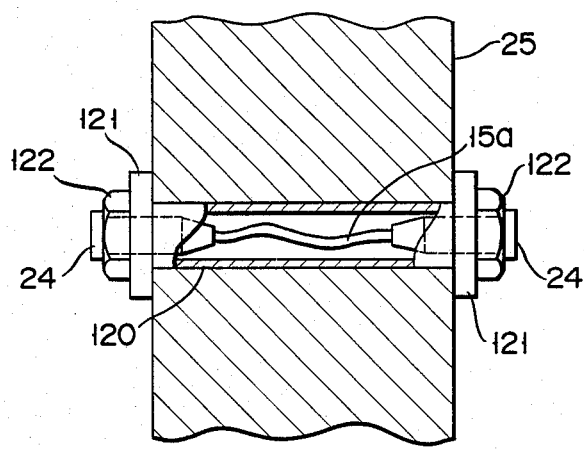
F I G. 13
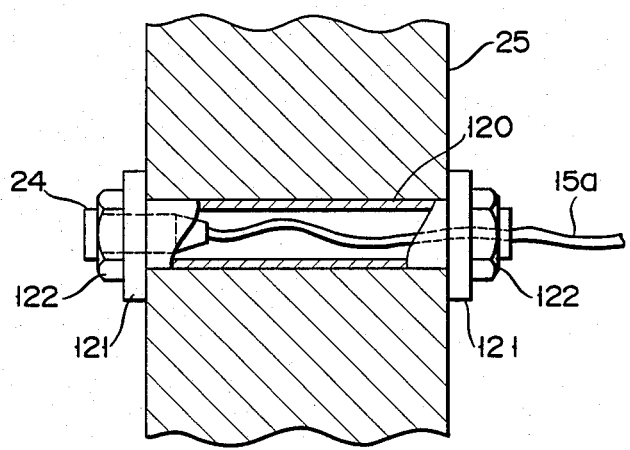

INDOOR WIRING SYSTEM FOR VHF/UHF SIGNAL LINES

BACKGROUND OF THE INVENTION

1. Field of the Invention

The present invention relates to a signal line wiring system for connecting a reception antenna for VHF/UHF bands, used for receiving TV and FM broadcast programs, to reception equipment, e.g., a TV receiver, audio equipment, and the like. More particularly, the present invention relates to an indoor signal line wiring system. If there are a plurality of sets of reception equipment, this wiring system allows even a person who does not have skills in electricity to easily connect signal lines to the reception equipment, and to easily and quickly modify the wiring state of the signal lines.

2. Prior Art

Conventionally, balanced feeders or coaxial cables are used as a signal line for connecting between an antenna for receiving TV and FM programs and reception equipment. Coaxial cables "3C-2V" and "5C-2V" are conventionally used for the coaxial cables.

An outdoor signal cable, whose one end of which is connected to the antenna, is brought into a house through an outer wall of the house. The other end of the cable is connected to a terminal device mounted on the inner wall of the house. One end of an indoor signal cable is connected to the terminal device, and the other end is connected to the input terminals of reception equipment, e.g., a TV receiver, audio equipment, and the like. As the indoor signal cable, a balanced feeder or a 3C-2V coaxial cable is conventionally used. The indoor signal cable, the terminal device, and the terminal of the reception equipment are connected, such that a jacket at the end portion of the indoor signal cable is peeled to expose the sheath and core, and they are fixed by a screw and a metal member of the terminal to achieve an electrical connection. Therefore, to connect the indoor cable, the terminals device, and the terminal of the reception equipment, a person requires some knowledge of electricity. If there are a lot of reception equipment units, intermediate equipment, e.g., a distributor, a booster, and the like, must be interposed between these reception equipment units and the terminal device. In this case, to connect the intermediate equipment and the indoor signal cable, the person requires a knowledge for electricity. In most cases, the connecting must be done by a special electrician. If the reception equipment and the terminal device are separate from each other, an indoor signal cable must be extended over a long distance, and must often be extended through a wall. If this is the case, the indoor signal cable is conspicuous, and impairs the room's appearance. In addition, such a connection of an indoor signal cable must be done by a special electrician.

SUMMARY OF THE INVENTION

It is a first object of the present invention to provide a wiring system for a signal cable, which can easily connect an indoor signal cable to a terminal device, reception equipment, intermediate equipment, and the like, even by a person who does not have skills in electricity.

It is a second object of the present invention to provide a wiring system for a signal cable, in which a signal cable is not conspicuous, and can be easily extended from one room to another through a gap of a door, and the like.

In the present invention, small-diameter coaxial cable, e.g., 1.7C-2V, is used as an indoor signal cable, and mini-plugs are connected to both ends of the coaxial cable to constitute a cable unit. Mini-jacks are connected to a terminal device, reception equipment, and intermediate equipment, which are, in turn, connected to an antenna. The mini-plugs are inserted in the corresponding mini-jacks, thus easily connecting the cable unit to these terminal devices, reception equipment, and the intermediate equipment. Therefore, a person who does not have skills in electricity can easily assemble the wiring system.

As the coaxial cable, a coaxial cable having an outer diameter of 6 mm or less, preferably having an outer diameter of 3.1 mm or less, e.g., a 1.7C-2V coaxial cable, is used. Therefore, the coaxial cable is not conspicuous, does not impair the appearance of the room, and can be easily extended to a neighbouring room through a gap of a door, or the like.

Different types of cable units having different lengths are prepared. Therefore, a user can select and use a cable unit having an appropriate length for each application. Since these cable units and the terminal device, reception equipment, and intermediate equipment are connected through the mini-plugs and mini-jacks, connection and disconnection can be easily performed, so that this wiring system can be easily and quickly modified.

BRIEF DESCRIPTION OF THE DRAWINGS

The present invention will be apparent from the description of the embodiments with reference to the accompanying drawings.

FIG. 12 is a partially cutaway, sectional, side view of a wall-through adapter;

FIG. 13 is a partial sectional side view of another wall-through adapter;

DESCRIPTION OF THE PREFERRED EMBODIMENTS

Figure 1:
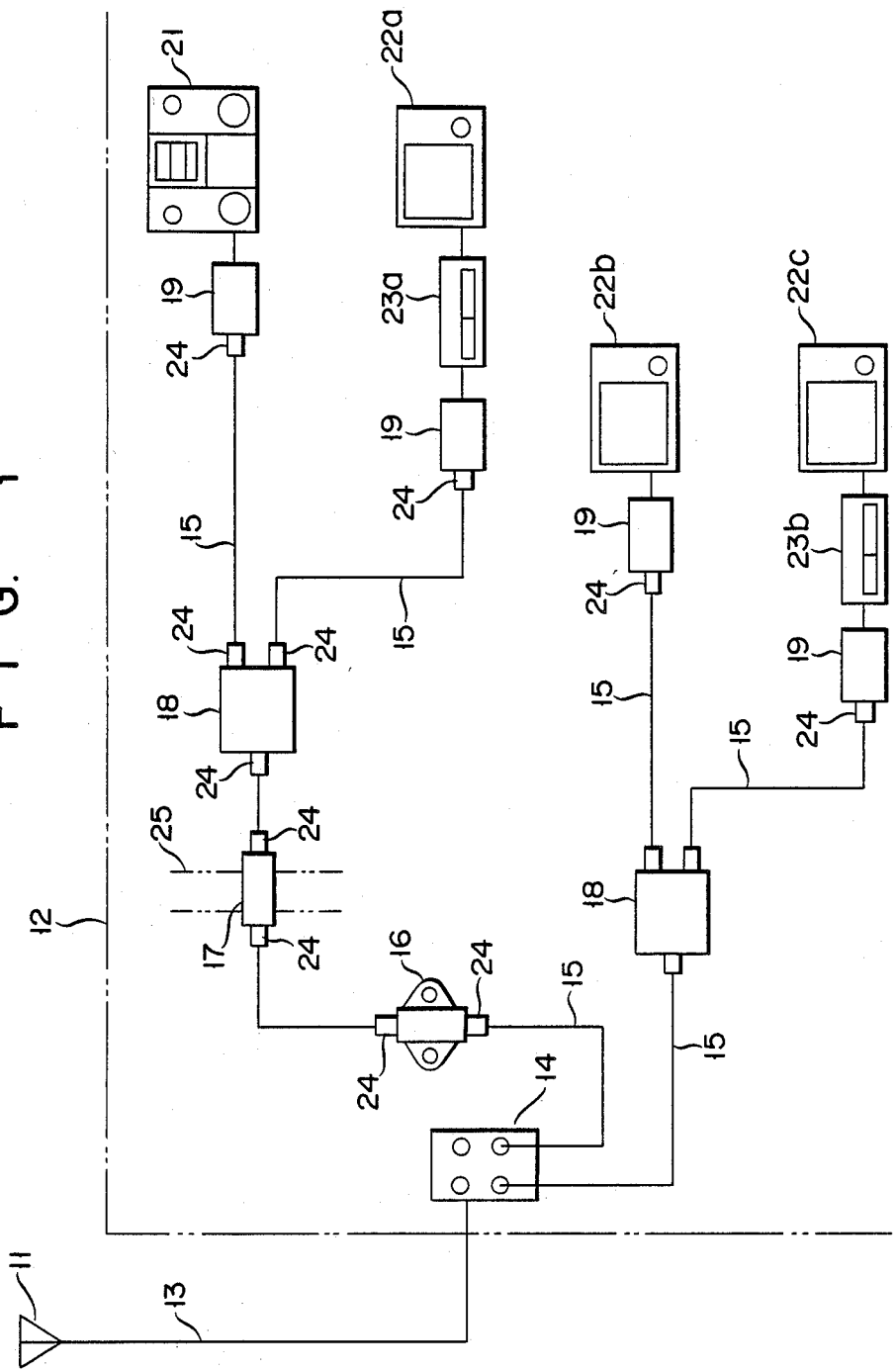
FIG. 1 is a schematic view of a wiring system of the present invention.

FIG. 1 schematically shows a wiring system of the present invention. In FIG. 1, reference numeral 11 denotes a reception antenna for receiving TV and FM broadcasting signals, i.e., for VHF and UHF bands; and 12, a house. One end of outdoor signal cable 13 is connected to antenna 11, and the other end thereof is extended inside house 12 to be connected to terminal device 14. Terminal device 14 is connected to a plurality of cable units 15. Cable units 15 are connected to reception equipment, e.g., audio equipment 21, TV receivers 22a, 22b, and 22c, and VTRs 23a and 23b, and the like through intermediate equipment, e.g., fixed repeater 16, wall-through adapter 17 extending through the wall of house 12, distributor 18, branching filter 19, and the like. The wiring system shown in FIG. 1 is an example, and intermediate equipment used is appropriately selected in correspondence with the number and the types of reception equipment.

Figure 2:
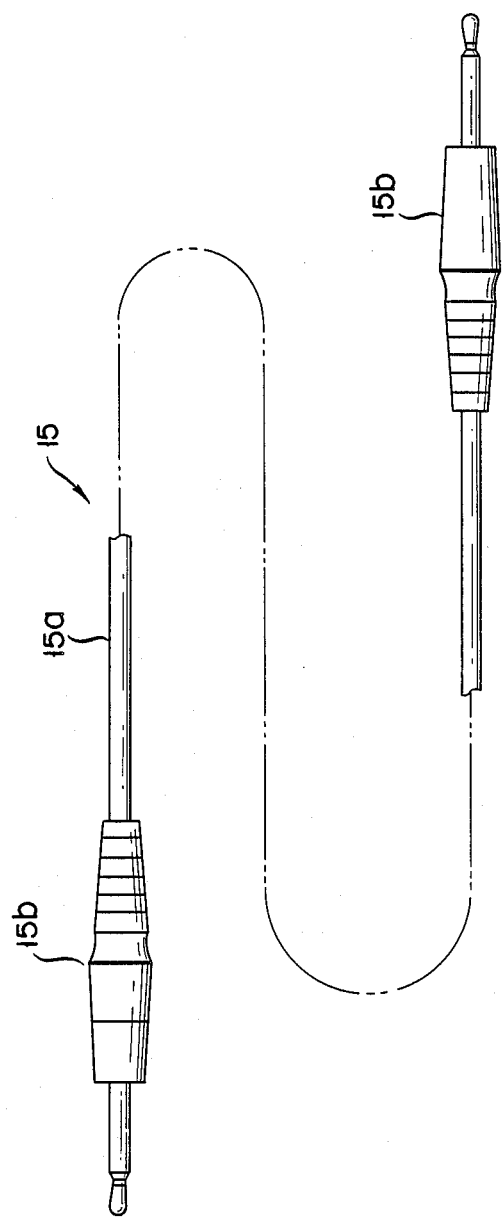
FIG. 2 is a side view of a cable unit used in the wiring system.

FIG. 2 shows cable unit 15. Cable unit 15 comprises coaxial cable 15a, and mini-plugs 15b are connected to the two ends of cable 15a. As cable 15a, a coaxial cable having an outer diameter of 6 mm or less, preferably, a 1.7C-2V coaxial cable having an outer diameter of 3.1 mm or less, is used. A plurality of cable units 15 having different lengths, e.g., 2 m, 5 m, 10 m, and 15 m, are prepared. A cable unit having an appropriate length is selected in correspondence with the arrangement of the reception equipment and intermediate equipment.

Figure 3:
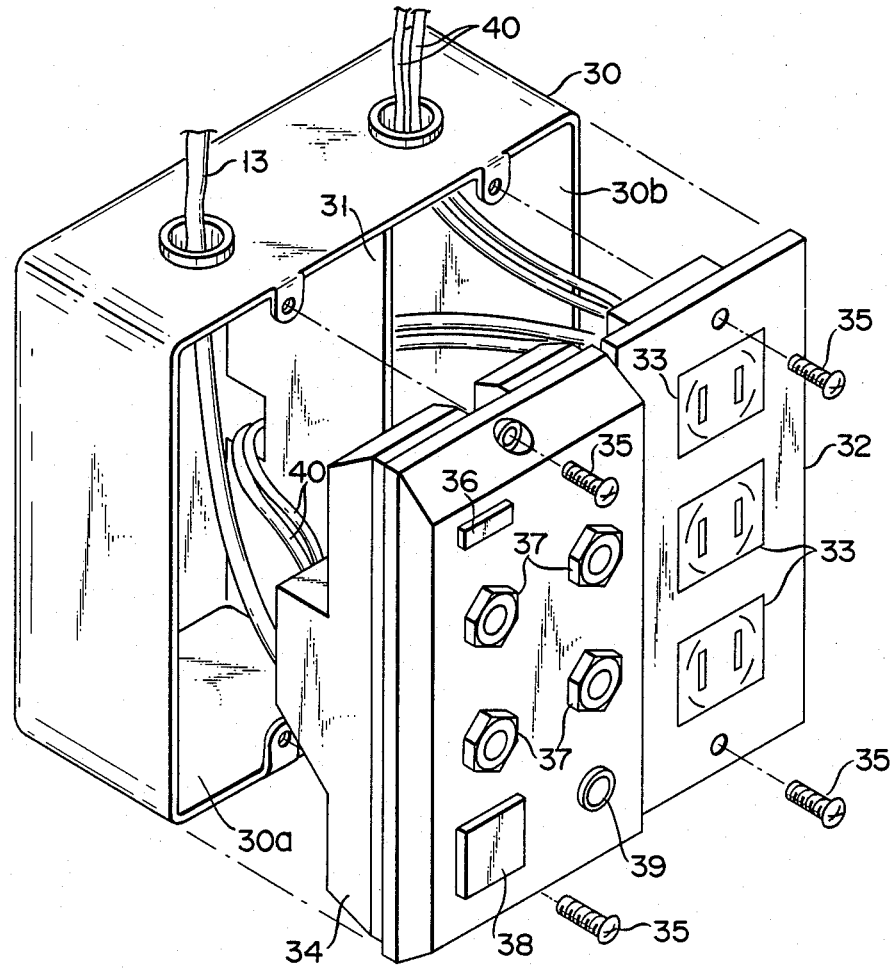
FIG. 3 is an exploded perspective view of a booster which also serves as a terminal device connected to an antenna.

FIG. 3 shows a first embodiment of terminal device 14. Terminal device 14 shown in FIG. 3 serves both as a booster and an AC power outlet. Terminal device 14 comprises outlet box 30. Box 30 is buried in the wall of the house. Box 30 is formed of steel plates, and has a rectangular box-like shape. The interior of box 30 is partitioned by partition plate 31 into booster housing 30a and outlet housing 30b. Booster 34 is housed in booster housing 30a, and outlet assembly 32 is housed in outlet housing 30b. Booster 34 and outlet assembly 32 are fixed to outlet box 30 by a plurality of fixing screws 35. Outlet assembly 32 comprises a plurality of, e.g., three, sockets 33, which are connected to AC power lines 40. Booster 34 comprises a synthetic resin case, and houses a signal amplifier, a distributor, and the like. Booster 34 is connected to AC power lines 40 to receive power. Booster 34 is also connected to outdoor signal cable 13. A plurality of, e.g., four, mini-jacks 37 are arranged on the front surface of booster 34, and are connected to mini-plugs 15b of cable units 15. Thus, signals are output through these mini-jacks 37. Pilot lamp 36 and power supply switch 38 are also arranged on the front surface of booster 34. In addition, DC power supply jack 39 is arranged on the front surface of booster 34. If an AC power supply cannot be used, a known DC power supply unit (not shown) is connected to DC power supply jack 39 to supply power to the booster.

Figure 4:
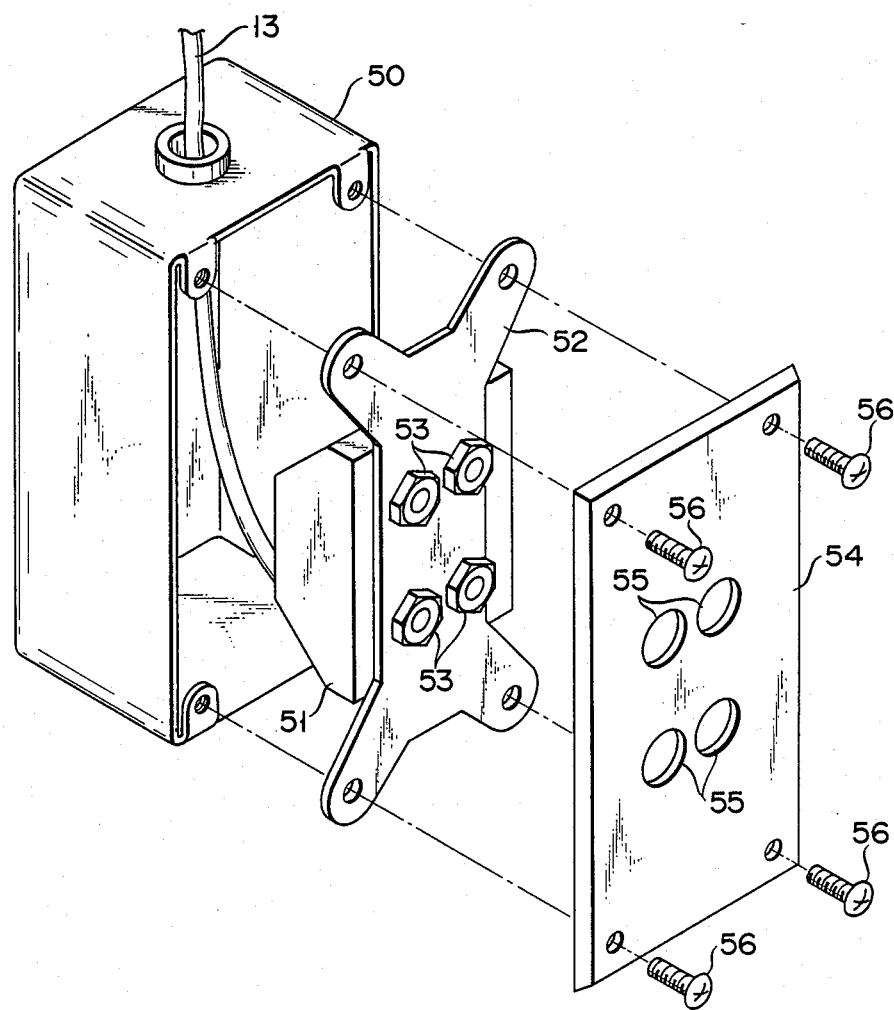
FIG. 4 is an exploded perspective view of the terminal device.

FIG. 4 shows another embodiment of terminal device 14. Terminal device 14 comprises outlet box 50 formed of steel plates, which houses terminal device body 51. Terminal device body 51 is mounted on outlet box 50 through mounting plate 52. A distributor and the like are housed in terminal device body 51, and are connected to outdoor signal cable 13. A plurality of, e.g., four, mini-jacks 53 project from the front surface of body 51, and extend through mounting plate 52. Signals are output through mini-jacks 53. Cover plate 54 is arranged in front of mounting plate 52. Cover plate 54 and mounting plate 52 are fixed to outlet box 50 by screws 56. Openings 55 are formed in cover plate 54 in correspondence with the positions of mini-jacks 53, and mini-jacks 53 extend through openings 55 to slightly project from the front surface of cover plate 54.

Figure 5:
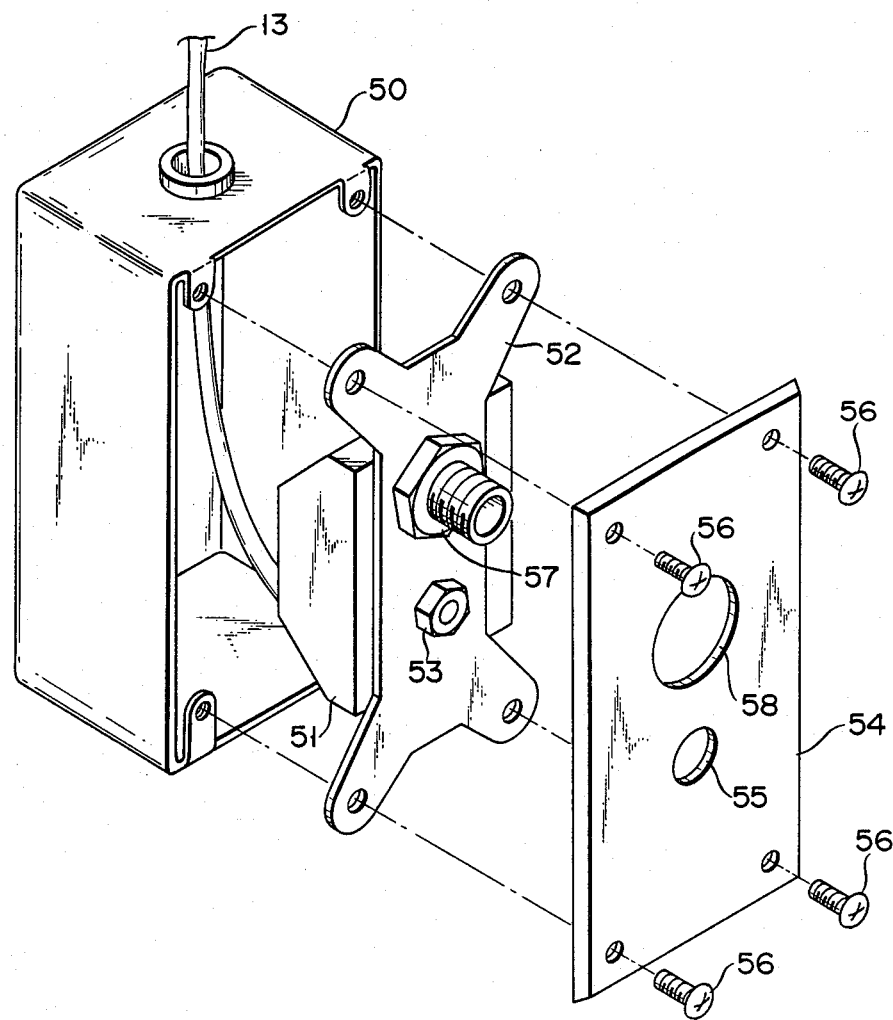
FIG. 5 is an exploded perspective view of another terminal device.

FIG. 5 shows still another embodiment of terminal device 14. This terminal device 14 has single mini-jack 53 arranged on device body 51, and also has F socket 57 used as a conventional connector for an indoor signal cable. Openings 55 and 56 corresponding to mini-jack 53 and F socket 57 are formed in cover plate 54. When the terminal device shown in FIG. 5 is used, both a wiring system of the present invention and a conventional wiring system using the F connector can be used.

Figure 6:
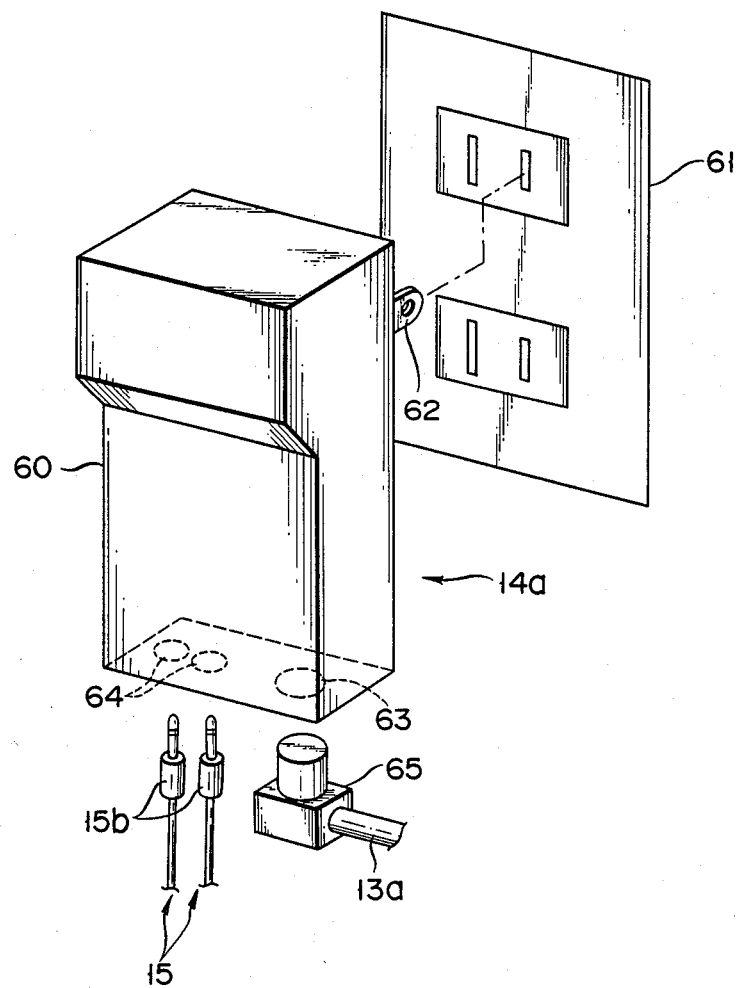
FIG. 6 is a perspective view of a booster.

The terminal devices shown in FIGS. 3, 4, and 5 are newly arranged on the house in order to use the wiring system of the present invention. However, when conventional terminal devices are already mounted on the house and are to be used without being changed, booster 60 shown in FIG. 6 is used. Booster 60 has plug 62 for an AC power supply. AC power outlet 61, arranged on a wall, is inserted in plug 62 to supply power to booster 60 and to hold booster 60 on the wall. Signal input jack 63 is arranged on the bottom surface of booster 60. Plug 65, arranged on an end portion of indoor signal cable 13a, is inserted in jack 63. Cable 13a is a cable used in a conventional signal line wiring system, e.g., a 3C-2V coaxial cable, and the other end portion thereof is connected to the terminal device. A plurality of, e.g., two, signal output mini-jacks 64 are arranged on the bottom surface of booster 60. Amplified signals are output through mini-jacks 64. These mini-jacks 64 are connected to mini-plugs 15b of cable units 15 of the wiring system of the present invention. Booster 60 also serves as a conversion connector for connecting the wiring system of the present invention to a conventional, already-arranged terminal device in addition to amplifying a signal.

Figure 7:
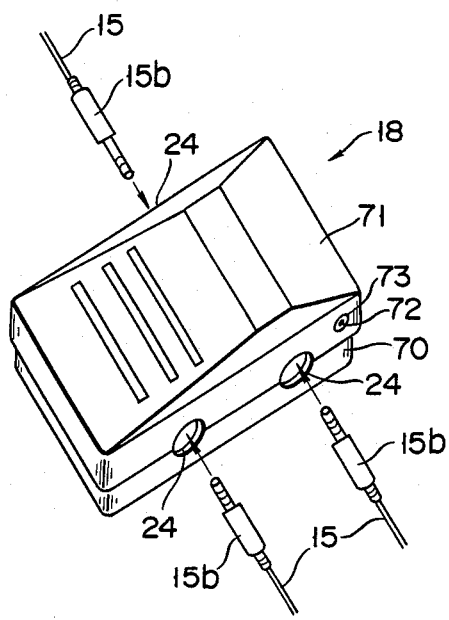
FIG. 7 is a perspective view of a distributor.
Figure 8:
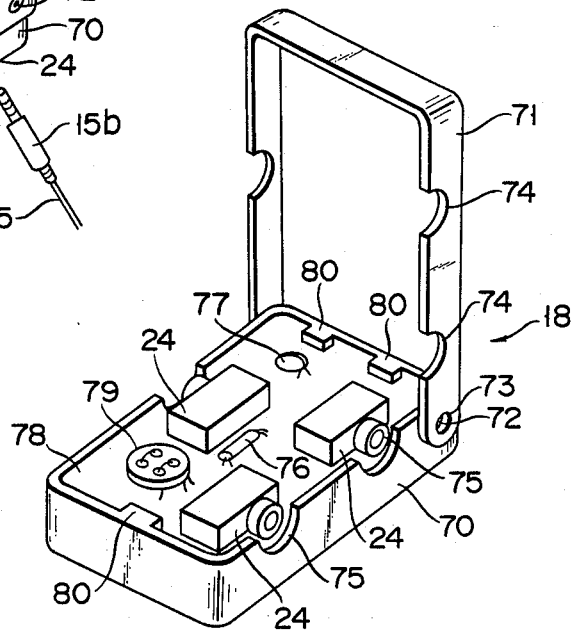
FIG. 8 is a perspective view showing a state wherein the cover of the distributor shown in FIG. 7 is open.
Figure 9:
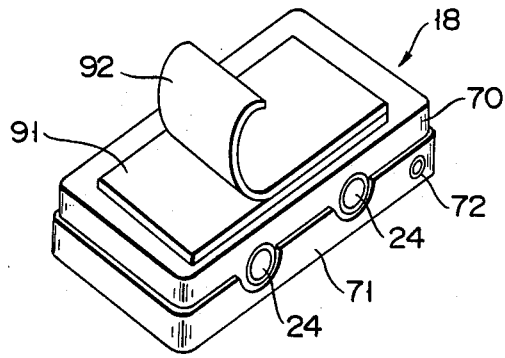
FIG. 9 is a perspective view of the distributor shown in FIG. 7 when viewed from the rear side.

FIGS. 7 to 9 show distributor 18, used in the wiring system of the present invention. Distributor 18 comprises case main body 70 and lid member 71. A pair of projections 72 project from the corner portions of the side surfaces of case main body 70, and holes 73 are formed in lid member 71 in correspondence with projections 72. Projections 72 are fitted in holes 73, so that lid member 71 is arranged to be openable/closable with respect to case main body 70. Printed circuit board 78 is housed in main body 70, and is held by projections 80 projecting from the inside of main body 70. Electrical parts, e.g., capacitor 77, resistor 76, distribution transformer 79, and the like, are arranged on printed circuit board 78. One input mini-jack 24 and two output mini-jacks 24 are arranged at edge portions of printed circuit board 78. These mini-jacks 24 are coupled to mini-plugs 15b of cable units 15. Semicircular notches 74 and 75 are formed in the edge portions of lid member 71 and case main body 70 in correspondence with the positions of mini-jacks 24. When lid member 71 is closed, the distal end portions of mini-jacks 24 are exposed from notches 74 and 75. A doublesided adhesive tape is adhered to the back surface of case main body 70, as shown in FIG. 9. Thus, backing sheet 92 is peeled, so that distributor 18 can be adhered and fixed to a wall through pressure-sensitive adhesive layer 91.

Figure 10:
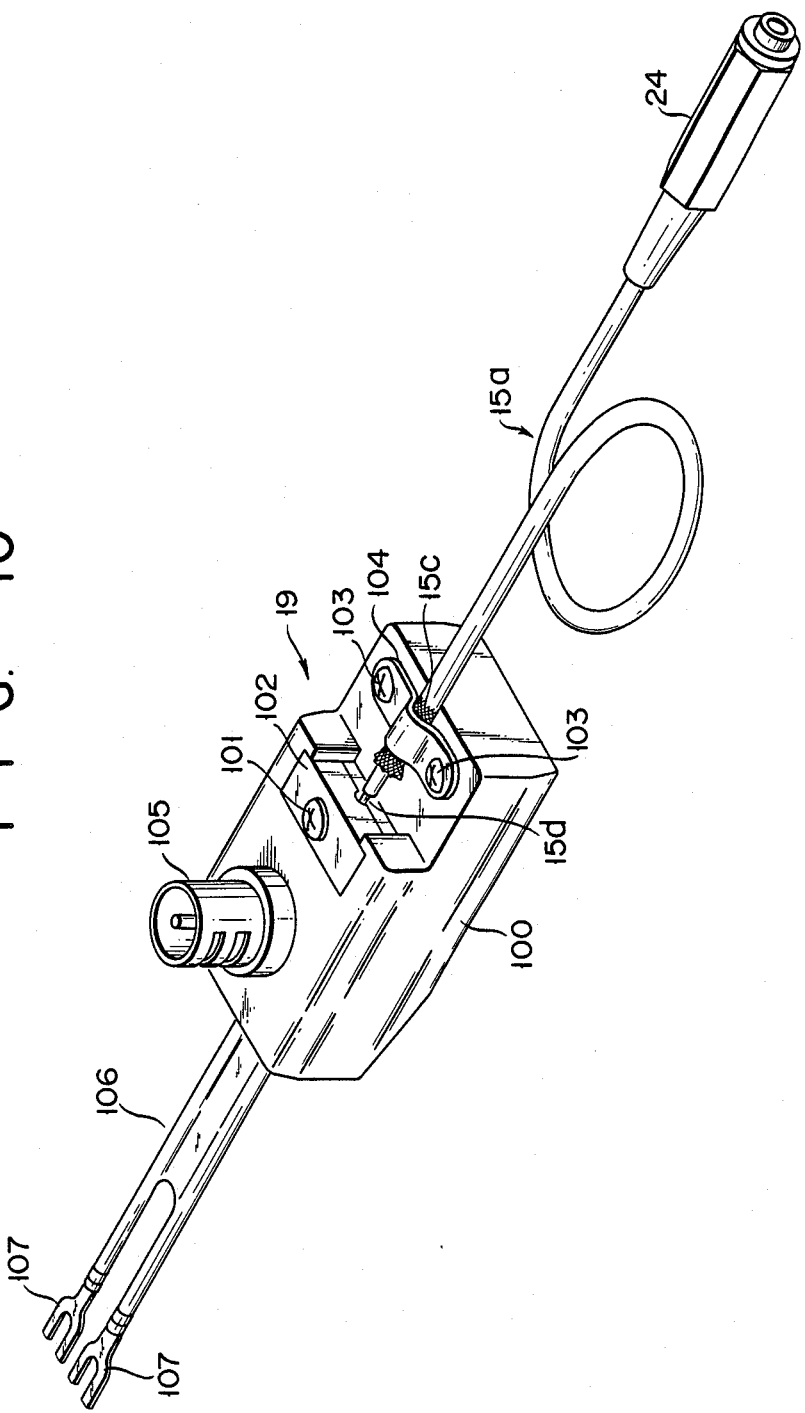
FIG. 10 is a perspective view of a branching filter.
Figure 11:
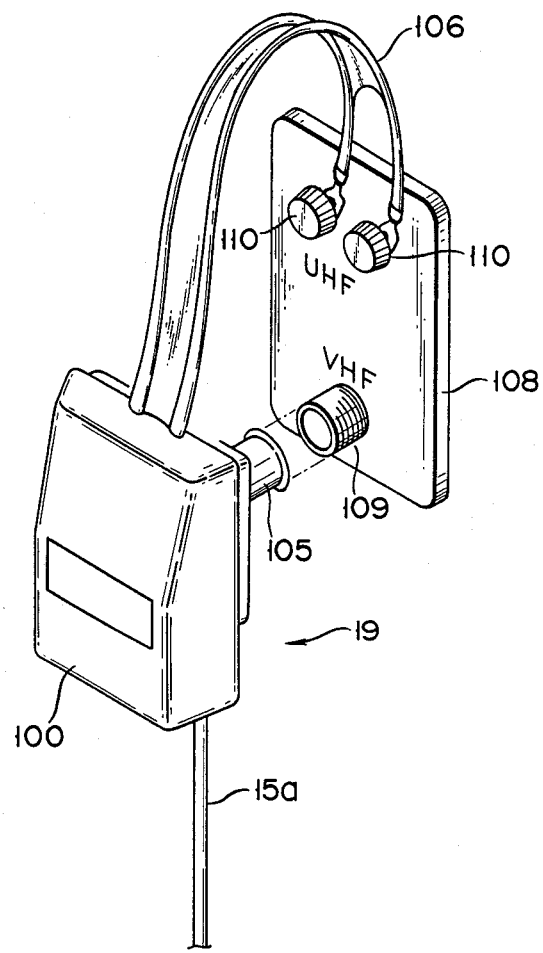
FIG. 11 is a perspective view showing a state wherein the branching filter shown in FIG. 10 is mounted.

FIGS. 10 and 11 show branching filter 19 used in the wiring system of the present invention. In this embodiment, branching filter 19 serves both as a branching filter for branching a signal into VHF and UHF signals and as a conversion connector for connecting the wiring system of the present invention to conventional reception equipment, e.g., a TV receiver.

When manufacturers of reception equipment adopt the wiring system of the present invention in the future, mini-jacks capable of being directly connected to mini-plugs 15b of cable units 15 of the present invention will be mounted on the reception equipment. In such a case, input and output mini-plugs are arranged on the branching filter. At present, however, no manufacturer of the reception equipment has adopted the wiring system of the present invention, and F sockets for inputting a VHF signal and terminals for balanced feeders for inputting a UHF signal are arranged on almost all reception equipment.

The branching filter of this embodiment corresponds to conventional reception equipment. Branching filter 19 comprises main body 100, which comprises a synthetic resin case and electrical parts housed therein. Main body 100 is coupled to one end of the same coaxial cable as that of cable unit 15 in the wiring system of the present invention, e.g., one end 15a of 1.7C-2V coaxial cable 15. Mini-jack 24 is arranged on the other end portion of coaxial cable 15a, and is coupled to mini-plug 15b of cable unit 15. A jacket of one end portion of cable 15a is removed to expose core 15d and sheath 15c. Core 15d is connected to the terminal of main body 100 by pressing member 102 and fixing screw 101, and sheath 15c is connected to the terminal by pressing metal member 104 and fixing screw 103. F plug 105 for outputting a VHF signal projects from the side surface of main body 100. Balanced feeder 106 for outputting a UHF signal is connected to the distal end portion of main body 100, and terminal 107 is coupled to the distal end of feeder 106.

As shown in FIG. 11, F plug 105 is connected to F socket 109 for inputting a VHF signal of terminal portion 108 of a conventional receiver, thus achieving an electrical connection and holding branching filter 19 with respect to this reception equipment. The reception equipment to which branching filter 19 is mounted as above can be easily connected to the wiring system of the present invention by simply connecting mini-plug 15b of cable unit 15 to mini-jack 24 of filter 19.

Various adapters are used when cable units 15 in the wiring system of the present invention are extended along a wall, a floor, a ceiling, and the like.

FIG. 1 shows fixed repeater 16 for connecting two cable units 15. Repeater 16 comprises a pair of mini-jacks 24 at its two end portions, and these mini-jacks 24 are electrically connected. When mini-jacks 24 are connected to mini-plugs 15b of cable units 15, two cable units 15 can be connected through repeater 16. Fixing holes or the like are formed in repeater 16, and repeater 16 can be fixed to a wall and the like by screws extending through the holes. As a matter of course, these holes need not be formed.

Coaxial cable 15a of cable unit 15 has a very small diameter, e.g., 3.1 mm, and can be extended to a neighboring room through a gap of a door and the like. However, if an appropriate gap is not present, wall-through adapter 17 shown in FIG. 12 is used. Wall-through adapter 17 comprises pipe 120 extending through wall 25 of the house. Two ends of pipe 120 extend from the surfaces of wall 25, and nuts 122 are threadably engaged with the two end portions through washers 121, thus fixing pipe 120 to the wall. Mini-jacks 24 are arranged on the two end portions of pipe 120, and are coupled to each other through coaxial cable 15a. Therefore, if such wall-through adapter 17 is arranged in the wall, the wiring system of the present invention can be extended to a neighboring room simply by connecting mini-jacks 24 of adapter 17 to mini-plugs 15b of cable units 15.

FIG. 13 shows another embodiment of wall-through adapter 17. In this adapter, one mini-jack is omitted, coaxial cable 15a is extended from one end of pipe 120, and mini-jack 24 is arranged on the distal end of coaxial cable 15a.

Coaxial cable 15a of cable unit 15 of the present invention has a small outer diameter. Therefore, if this coaxial cable 15a is extended along the corner of a room, it is not so conspicuous, and will not impair the room's appearance. However, in order to conceal coaxial cable 15a, or in order to fix cable 15a not to be loosened, various holding members shown in FIGS. 14 to 17 are used.

Figure 14:
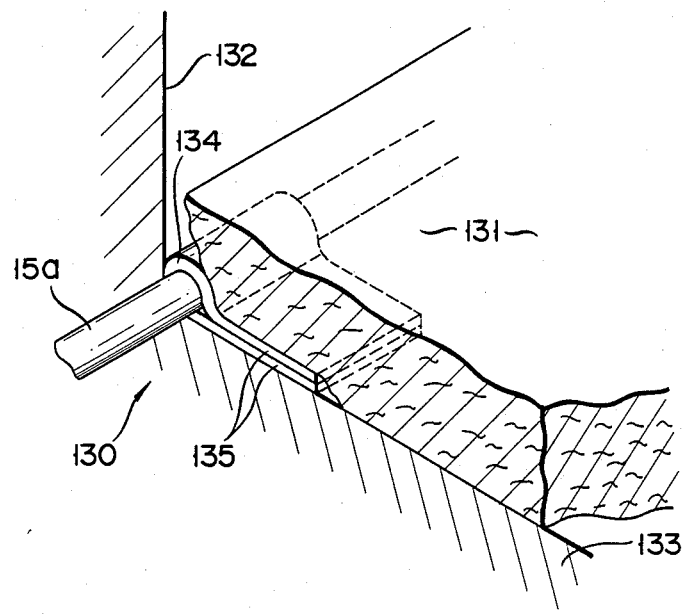
FIG. 14 is a perspective view of a holding member of a cable unit.

FIG. 14 shows holding member 130 for holding coaxial cable 15a at an edge portion of carpet 131. Holding member 130 is formed by bending a synthetic resin or metal thin plate, and has substantially circular holding portion 134 and a pair of leg portions 135. Coaxial cable 15a is inserted through holding portion 134 and is clamped between the edge of carpet 131 and wall 132, or leg portions 135 are clamped between the bottom surface of carpet 131 and floor 133, thus holding coaxial cable 15a at a predetermined position. Note that holding members 130 are mounted on cable 15a at equal intervals. If such holding member 130 is used, coaxial cable 15a will not be loosened to move on carpet 131. If a pressure-sensitive adhesive is attached to leg portions 135 of holding member 130, coaxial cable 15a can be more firmly fixed.

Figure 15:
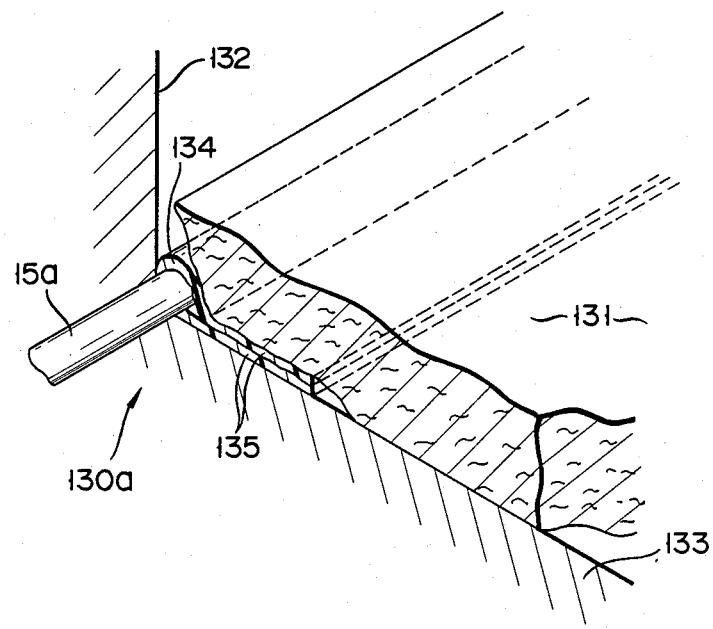
FIG. 15 is a perspective view of another holding member.

FIG. 15 shows holding member 130a of another embodiment. Holding member 130a has an elongated cylindrical shape, and has the same sectional shape as that shown in FIG. 14.

Figure 16:
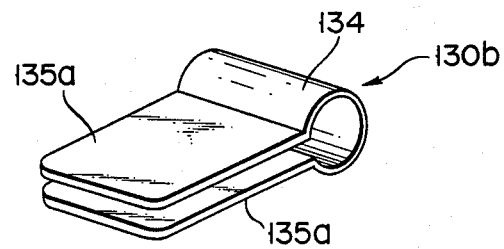
FIG. 16 is a perspective view of still another holding member.
Figure 17:
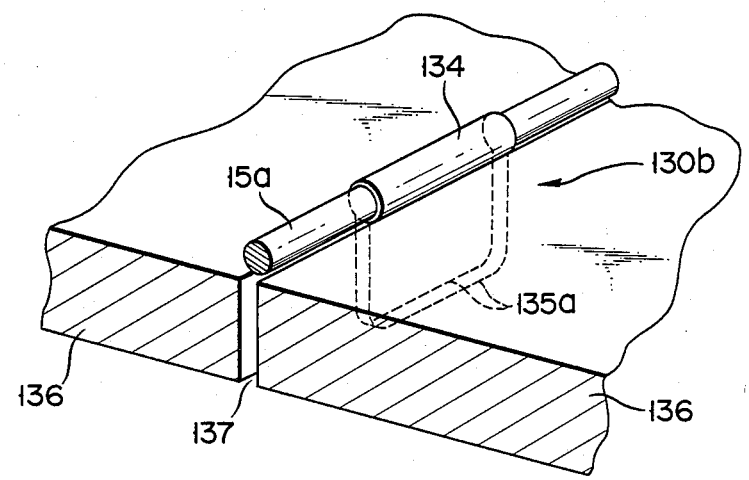
FIG. 17 is a perspective view showing a state wherein the holding member shown in FIG. 16 is in use.

FIGS. 16 and 17 show a holding member 130b for a tatami mat. In this holding member, leg portions 135a linearly extend from holding portion 134. These leg portions 135a are inserted in gap 137 between edge portions of tatami mats 136 to hold coaxial cable 15a.

The present invention is not limited to the above embodiments, and various changes and modifications may be made within the spirit and scope of the present invention.

What is claimed is:

1. An indoor wiring system for communicating VHF and UHF band signals to a signal receiving device within a house, comprising:
   antenna means disposed outside of said house for receiving RF signals;
   an outdoor signal line connected to said antenna means for carrying said received RF signals;
   a terminal device installed on an indoor wall of said house and connected to said outdoor signal line, said terminal device including:
      booster amplifier means for amplifying said received signals to produce an amplified signal at an output thereof, and
      plural signal output mini jacks connected to said booster amplifier means output for outputting the amplified signals;

an indoor coaxial cable assembly means for supplying said amplified signal to said signal receiving device, said assembly means including a coaxial cable no more than 6 mm in diameter terminating in a mini plug at first and second ends thereof, said first end mini plug being connected to said one of said plural terminal device mini jacks;

an outlet box disposed in a wall of said house, said box including a partition plate dividing a space defined within said box into first and second interior spaces, house current electrical components disposed in said first interior space, said components including means for connecting to an AC power source, and a plate disposed over said outlet box second interior space, said plural mini jacks and said house current electrical component being mounted to said plate;

wherein said booster amplifier means is disposed in said outlet box second interior space and includes means for connecting to said electrical house current component.

2. A system as in claim 1 wherein said coaxial cable comprises a 1.7C-2V coaxial cable which is 3.1 mm or less in diameter.

3. A system as in claim 1 wherein said terminal device house current electrical components includes AC outlet means for providing A.C. power.

4. A system as in claim 1 wherein said booster amplifier means includes means for connecting directly to said outdoor signal line.

5. A modular indoor wiring system for supplying RF signals to plural receiving devices, including:

terminal means for installation into an interior wall, said terminal means including:

a front plate means for installation flush with said interior wall, booster amplifier means for connecting to a first, weather resistant outdoor coaxial RF cable having a certain diameter and for amplifying RF signals carried by said first RF cable to provide amplified versions of said signals at an output thereof, and a plurality of miniature-type unbalanced jacks each electrically connected to said booster amplifier means output and mounted to said front plate means;

plural indoor coaxial cable assemblies each including an indoor type second coaxial cable having a second diameter substantially less than said first cable certain diameter, said second cables each terminating in miniature type plugs at first and second ends thereof, said first end miniature type plugs for connection to said plurality of terminal means miniature jacks, said second end miniature type plugs for connection to said plural receiving devices; and a wall through adapter means for mounting within an interior wall, said adapter means comprising:

elongated hollow pipe means for placement within a bore through said wall, said pipe means having first and second ends;

first miniature jack means disposed at said pipe means first end for connection to one of said cable assembly means second end miniature type plugs;

a second miniature jack disposed at said pipe means second end; and a further indoor coaxial cable assembly including said indoor type second coaxial cable having a second diameter substantially less than said first cable certain diameter, said second cable terminating in miniature type plugs at first and second ends thereof, said first cable end miniature type plug for connection to said second miniature jack disposed at said pipe means second end, said second cable end miniature type plug for connection to said plural receiving devices.

6. A system as in claim 5 wherein said miniature type plugs each comprise single connection portion means for insertion into a corresponding miniature type jack, said connection portion means comprising a cylindrical elongated conductive member terminating in a bulbous conductive termination member, said elongated member being separated from said termination member by an insulative member.

* * * * *